United States Patent
Doing et al.

(10) Patent No.: US 8,479,184 B2
(45) Date of Patent: Jul. 2, 2013

(54) GENERAL PURPOSE EMIT FOR USE IN VALUE PROFILING

(75) Inventors: Richard William Doing, Raleigh, NC (US); Venkat Rajeev Indukuru, Austin, TX (US); Alexander Erik Mericas, Austin, TX (US); Mauricio Jose Serrano, Bronx, NY (US); Zhong Liang Wang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 12/861,955

(22) Filed: Aug. 24, 2010

(65) Prior Publication Data

US 2012/0054726 A1 Mar. 1, 2012

(51) Int. Cl.
*G06F 9/45* (2006.01)

(52) U.S. Cl.
USPC .......... 717/158; 717/124; 717/100; 717/135; 712/208; 709/103; 710/260

(58) Field of Classification Search
USPC ............... 717/158, 124, 100, 135; 712/208, 712/244; 709/103
See application file for complete search history.

(56) References Cited

U.S. PATENT DOCUMENTS

| | | | | |
|---|---|---|---|---|
| 4,080,650 A | * | 3/1978 | Beckett | 717/129 |
| 4,590,550 A | | 5/1986 | Eilert et al. | 364/200 |
| 5,845,310 A | * | 12/1998 | Brooks | 711/3 |
| 6,763,452 B1 | | 7/2004 | Hohensee et al. | 712/227 |
| 7,409,677 B1 | | 8/2008 | Leventhal et al. | 717/130 |
| 7,475,394 B2 | | 1/2009 | Calder et al. | 717/158 |
| 7,950,004 B2 | * | 5/2011 | Vieira et al. | 717/125 |
| 8,255,780 B2 | * | 8/2012 | Saha et al. | 714/792 |
| 2006/0259750 A1 | * | 11/2006 | Swoboda | 712/227 |
| 2007/0006173 A1 | * | 1/2007 | Sohm et al. | 717/131 |
| 2007/0220342 A1 | * | 9/2007 | Vieira et al. | 714/33 |

* cited by examiner

*Primary Examiner* — Vanel Frenel
(74) *Attorney, Agent, or Firm* — VanLeeuwen & VanLeeuwen; Matthew W. Baca

(57) ABSTRACT

An information handling system includes a memory, a processor, and an instruction tracking unit. The processor executes program code and, while the program code executes, the instruction tracking unit decodes a multi-purpose no-op instruction within the program code. In turn, the instruction tracking unit sends an interrupt to the processor, which invokes a profiling module to collect and store profiling data in a profiling buffer.

17 Claims, 8 Drawing Sheets

GENERAL PURPOSE EMIT FOR USE IN VALUE PROFILING

TECHNICAL FIELD

The present disclosure relates to collecting profiling data while executing program code and using the collected profiling data to subsequently optimize the program code.

BACKGROUND

Software profiling is a form of program analysis that investigates a software program's behavior using information gathered as the program executes. A compiler may use software profiling in order to identify particular sections of a software program for which to optimize, such as an event-based profiler, a statistical profiler, or an instrumentation profiler. An event-based profiler may be configured to trap events such as calls and class-loads. A statistical profiler may be configured to probe a software program's program counter at regular intervals using operating system interrupts. And, an instrumentation profiler may add additional instructions to the software program in order to gather information as the program executes.

SUMMARY

An information handling system includes a memory, a processor, and an instruction tracking unit. The processor executes program code and, while the program code executes, the instruction tracking unit decodes a multi-purpose no-op instruction within the program code. In turn, the instruction tracking unit sends an interrupt to the processor, which invokes a profiling module to collect and store profiling data in a profiling buffer.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Figure 1:
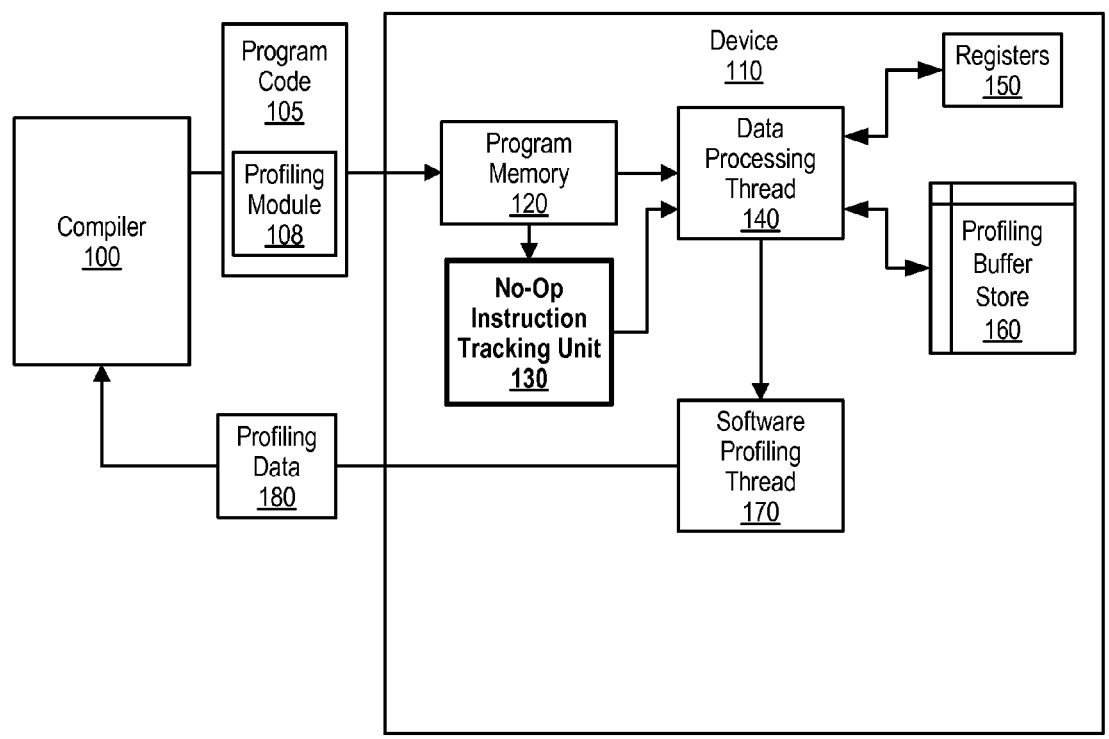
FIG. 1 is a diagram showing a device's no-op instruction tracking unit invoking synchronous interrupts to a data processing thread in order for the data processing thread's profiling module to collect profiling data at specific program code instrumentation points.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a device's no-op instruction tracking unit invoking synchronous interrupts to a data processing thread in order for the data processing thread to collect profiling data at specific program code instrumentation points. In turn, the device provides the profiling data to the compiler in order for the compiler to further optimize the program code.

Compiler 100 analyzes program code 105 and selects "instrumentation points" in program code 105 based on several static or dynamic heuristics, such as the estimated execution time within a method. At each instrumentation point, compiler 100 inserts a "multi-purpose no-op instruction." A multi-purpose no-op instruction is similar to a standard no-op instruction in that it is devoid of being executed by an execution unit. However, the multi-purpose no-op instruction may also cause no-op instruction tracking unit 130 to invoke a synchronous interrupt based upon particular multi-purpose no-op monitoring parameters (e.g., generate a synchronous interrupt 100 multi-purpose no-op instructions). Thus, multi-purpose no-op instructions have multiple purposes. In one embodiment, no-op instruction tracking unit 130 is a hardware module that uses logic gates to track the number of multi-purpose no-op instructions. In another embodiment, no-op instruction tracking unit 130 may reside in firmware to track multi-purpose no-op instructions (see FIG. 3 and corresponding text for further details).

In addition to including multi-purpose no-op instructions in program code 105, compiler 100 also includes profiling module 108 (software code) in program code 105, which collects profiling data when an interrupt occurs. In turn, compiler 100 sends program code 105 to device 110, which loads program code 105 into program memory 120 (e.g., program cache). In one embodiment, compiler 100 may load profiling module 108 onto device 110's operating system. In another embodiment, device 110 includes an interrupt handler that performs profiling module 108's functions described herein. In yet another embodiment, device 110 may include hardware-based logic to perform profiling logic 108's functions described herein.

Device 110 invokes data processing thread 140 to execute program code 105. In addition, device 110 configures no-op instruction tracking unit 130 to invoke synchronous interrupts based upon multi-purpose no-op monitoring parameters (e.g., trigger thresholds) that may be included in program code 105.

When data processing thread 140 receives the synchronous interrupt from no-op instruction tracking unit 130, profiling module 108 executing in data processing thread 140 collects profiling data from, for example, registers 150 and stores the profiling data in profiling buffer store 160. Data processing thread 140 then executes a "return from interrupt", thus restoring execution.

In one embodiment, data processing thread 140 also checks the "state" of the profiling buffer. For example, data processing thread 140 may be allowed a particular amount of profiling data for which to store in profiling buffer store 160 due to memory size constraints. In this example, data processing thread 140 sends an interrupt to software profiling thread 170 to collect the profiling data from profiling buffer store 160. In turn, software profiling thread 170 provides profiling data 180 to compiler 100. In this embodiment, software profiling thread 170 may utilize as much time as required to retrieve and process the profiling data since software profiling thread 170 operates in parallel with data processing thread 140 (see FIG. 6 and corresponding text for further details).

Once compiler 100 receives profiling data 180, compiler 100 optimizes program 105 accordingly. In one embodiment, compiler 100 may progress through multiple optimization iterations by inserting multi-purpose no-op instructions at different instrumentation points and sending program code 105 to device 110 for device 110 to collect profiling data at different points (or at different memory locations).

Figure 2:
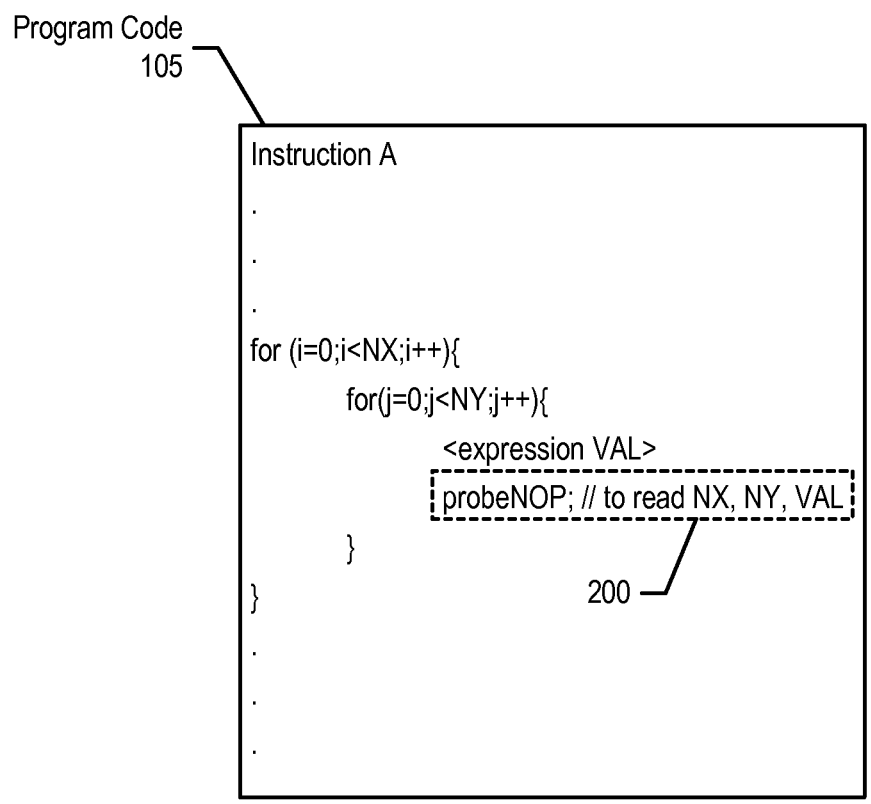
FIG. 2 is a diagram showing an example of program code that includes a multi-purpose no-op instruction.

FIG. 2 is a diagram showing an example of program code that includes a multi-purpose no-op instruction. Compiler 100 (shown in FIG. 1) analyzes program code 105 and identifies instrumentation points for which to insert multi-purpose no-op instruction 200 (see FIG. 5 and corresponding text for further details). Compiler 100 may select instrumentation points based on several static and/or dynamic heuristics. The instrumentation points may be locations within program code where several profiling data values may be concurrently collected. Instrumentation points may also be at locations within program code 105 that are frequently decoded, such as within a loop.

The example shown in FIG. 2 shows that compiler 100 inserted multi-purpose no-op instruction 200 at a location for sampling a loop's upper bound values (NX,NY) and a value VAL. In this example, compiler 100 selected the instrumentation point in the inner-most loop because of the likelihood of more frequent decoding, thus reaching a trigger threshold to collect profiling data.

Figure 3:
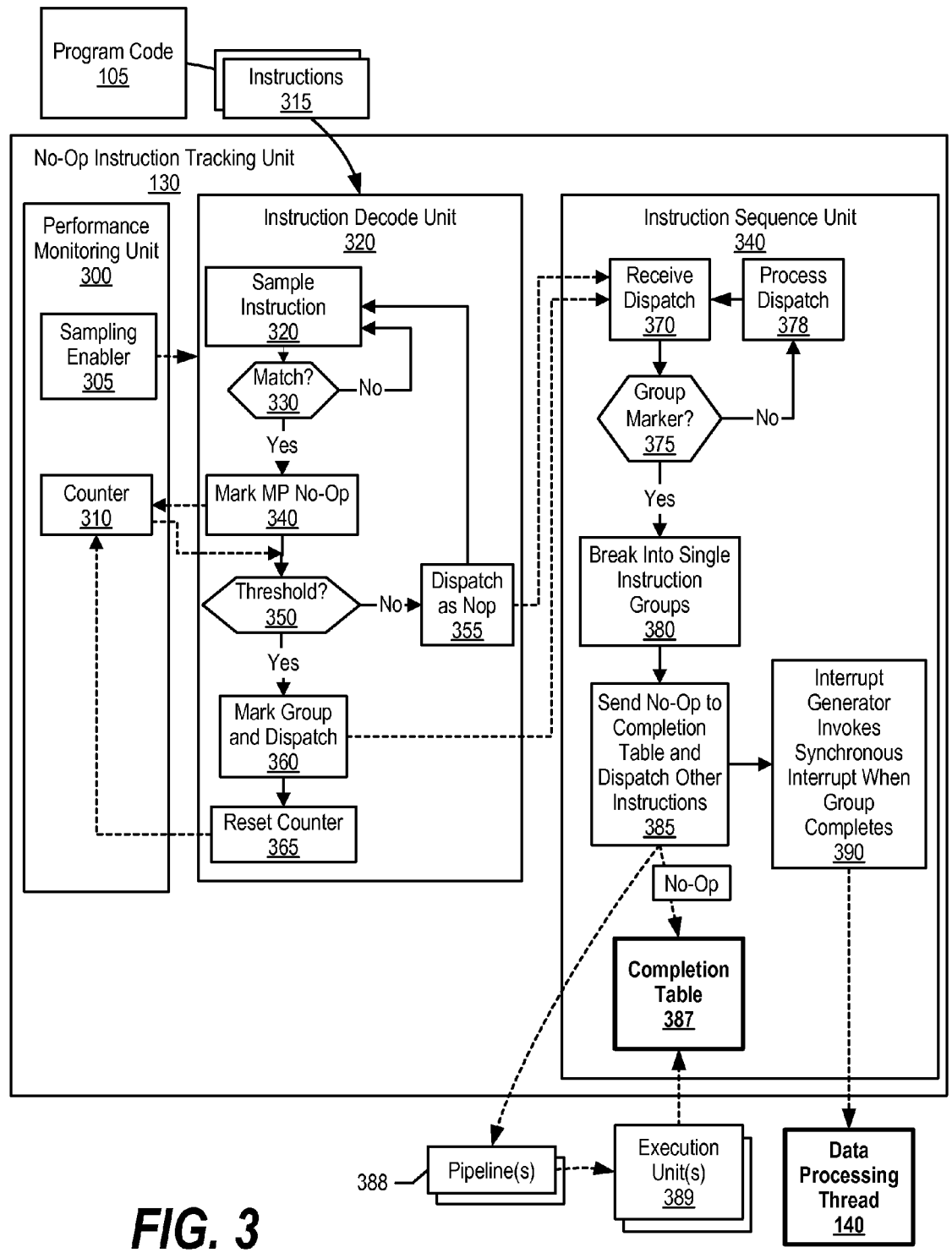
FIG. 3 is a diagram showing a no-op instruction tracking unit invoking interrupts after detecting a number of decoded multi-purpose no-op instructions.

FIG. 3 is a diagram showing a no-op instruction tracking unit invoking interrupts after detecting a number of decoded multi-purpose no-op instructions. No-op instruction tracking unit 130 includes performance monitoring unit 300, instruction decode unit 320, and instruction sequence unit. In one embodiment, no-op instruction tracking unit 130 uses hardware logic to perform steps/actions discussed herein.

Performance monitoring unit 300 includes sampling enabler 305 and counter 310. Sampling enabler 305 informs instruction decode unit 320 when to begin sampling instructions 315. Counter 310 tracks the number of multi-purpose no-op instructions that are decoded by instruction decode unit 320 (discussed below).

Instruction decode unit 220 samples an instruction group included in instructions 315 (from program code 105) at step 320, instruction decode unit 320 determines whether the instruction group includes a multi-purpose no-op instruction (decision 330). As discussed herein, a compiler previously inserted the multi-purpose no-op instructions in program code 105 during a program code profiling phase (see FIG. 5 and corresponding text for further details). If the instruction group does not include a multi-purpose no-op instruction, instruction decode unit samples another instruction group. Once instruction decode unit 320 detects that the instruction group includes a multi-purpose no-op instruction, instruction decode unit 320 increments counter 310 at step 340. In one embodiment, multi-purpose no-op instructions may be marked "first" in an instruction group, which simplifies instruction dispatch unit 320's logic (e.g., single slot matching).

Instruction decode unit 320 determines whether counter 310 has reached a threshold based upon multi-purpose no-op monitoring parameters (e.g., every 100 multi-purpose no-op instructions) (decision 350). If the threshold has not been reached, instruction decode unit 320 dispatches the instruction group accordingly at step 355 and the multi-purpose no-op instruction is treated as a standard no-op instruction. On the other hand, if the threshold has been reached, instruction decode unit 320 marks the instruction group and dispatches the marked instruction group to instruction sequencing unit 340 (step 360). Instruction decode unit 320 also resets counter 310 at step 365.

Instruction sequencing unit 340 receives the instruction group (marked and unmarked) at step 370, and determines whether the instruction group was marked by instruction decode unit 220 (decision 375). If the instruction group is not marked, instruction sequence unit 240 processes and dispatches the instruction group accordingly (step 378). On the other hand, if the instruction group is marked, instruction sequencing unit 240 breaks the instruction group into single instruction groups (one instruction per group) at step 385. In turn, instruction sequencing unit 240 sends the executable instructions, which are instructions other than the multi-purpose no-op instruction, to pipelines 388 that, in turn, are executed by execution units 387. Instruction sequencing unit 240 also sends the multi-purpose no-op instruction to completion table 387 (bypassing execution units 389). Instruction sequence unit 340's interrupt generator waits for execution units 389 to complete the executable instructions and store results in completion table 387, at which point the interrupt generator invokes a synchronous interrupt to device 100's processor, which invokes the profiling module executing in data processing thread 140 to collect profiling data. As such, due to the fact that the interrupt is synchronous, the profiling module collects profiling data at a specific execution point of program code 105.

Figure 4:
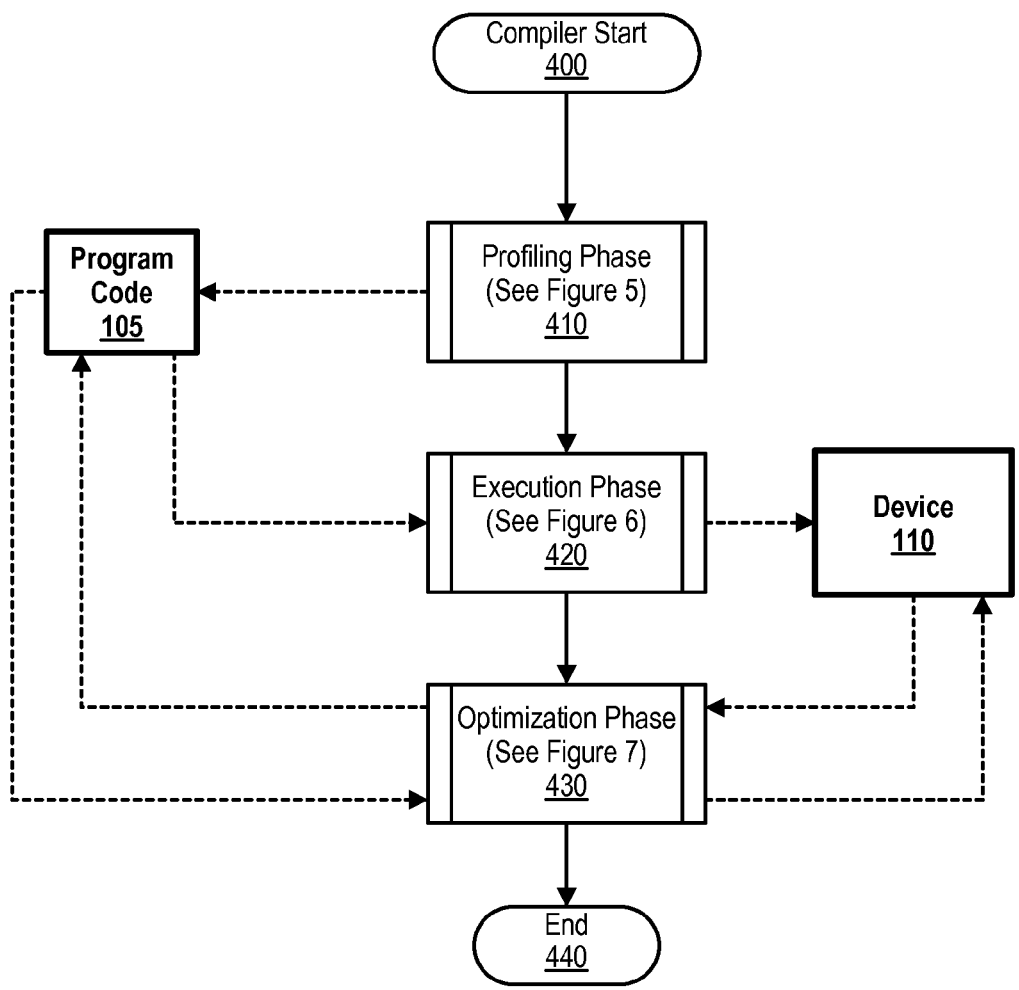
FIG. 4 is a flowchart showing steps taken in a compiler optimizing program code through value profiling.

FIG. 4 is a flowchart showing steps taken in a compiler optimizing program code through value profiling. Compiler processing commences at 400, whereupon the compiler analyzes program code 105 and identifies instrumentation points to insert multi-purpose no-op instructions. The compiler may select these instrumentation points based upon several static or dynamic heuristics as discussed herein (pre-defined process block 410, see FIG. 5 and corresponding text for further details).

Once the compiler includes multi-purpose no-op instructions in program code 105 at various instruction points, the compiler includes a profiling module in program code 105 and loads program code 105 onto device 110, which device 110 executes. During execution, a no-op instruction tracking unit tracks the number of times that a multi-purpose no-op instruction is included in an instruction group (decoded). When the number of times exceeds a threshold, the no-op instruction tracking unit invokes a synchronous interrupt, which causes a data processing thread executing program code 105's profiling module to retrieve profiling data from memory locations such as general purpose registers, special purpose registers, etc., and store the profiling data in a profiling buffer. In addition, when the data processing thread detects that the profiling buffer is full, the data processing thread sends an interrupt to a software profiling thread to process the sampled values in the profiling buffer (pre-defined process block 420, see FIGS. 3, 6 and corresponding text for further details).

Figure 7:
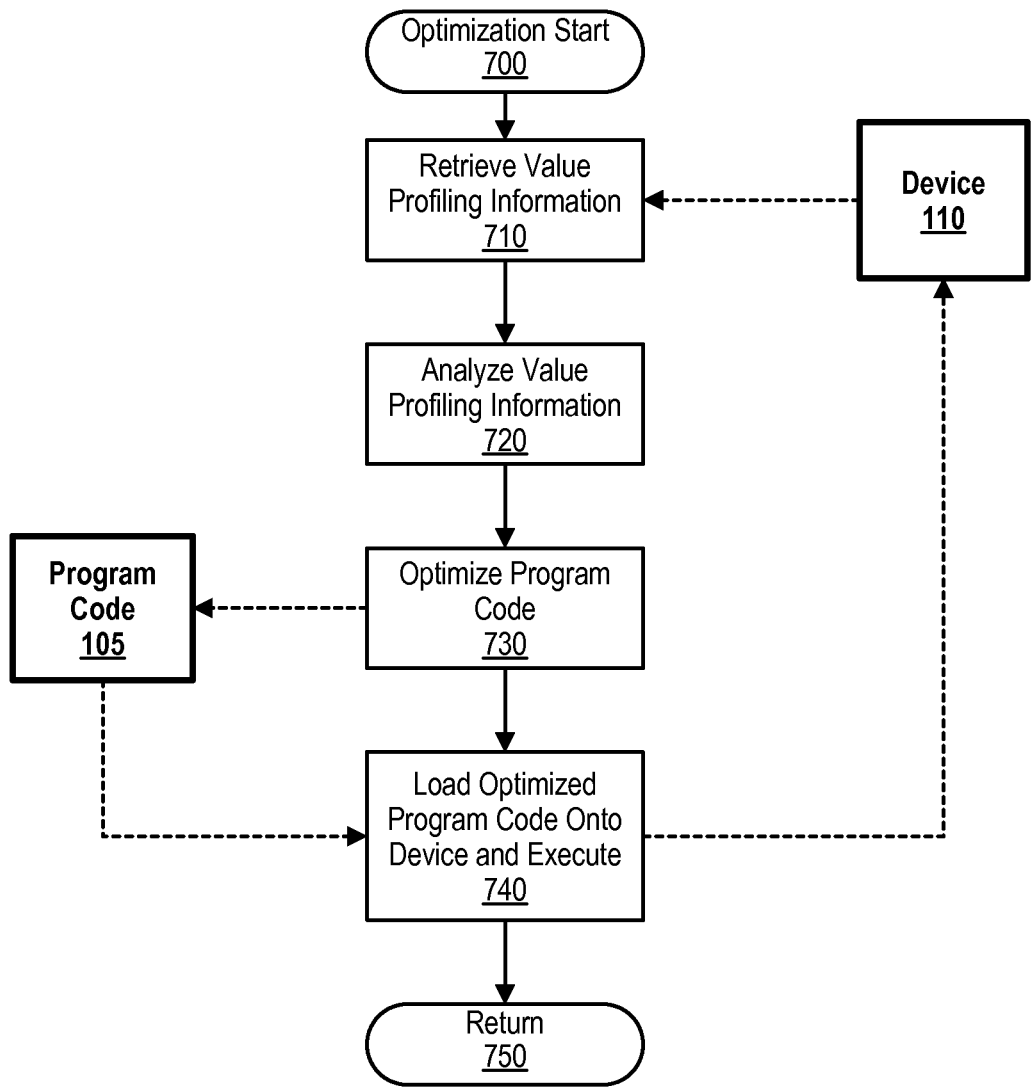
FIG. 7 is a flowchart showing steps in a compiler using collected profiling data to optimize program code.

Next, when device 110 terminates program execution, the compiler retrieves the sampled data and uses the sampled data to optimize program code 105 (pre-defined processing block 430, see FIG. 7 and corresponding text for further details). Processing ends at 440.

Figure 5:
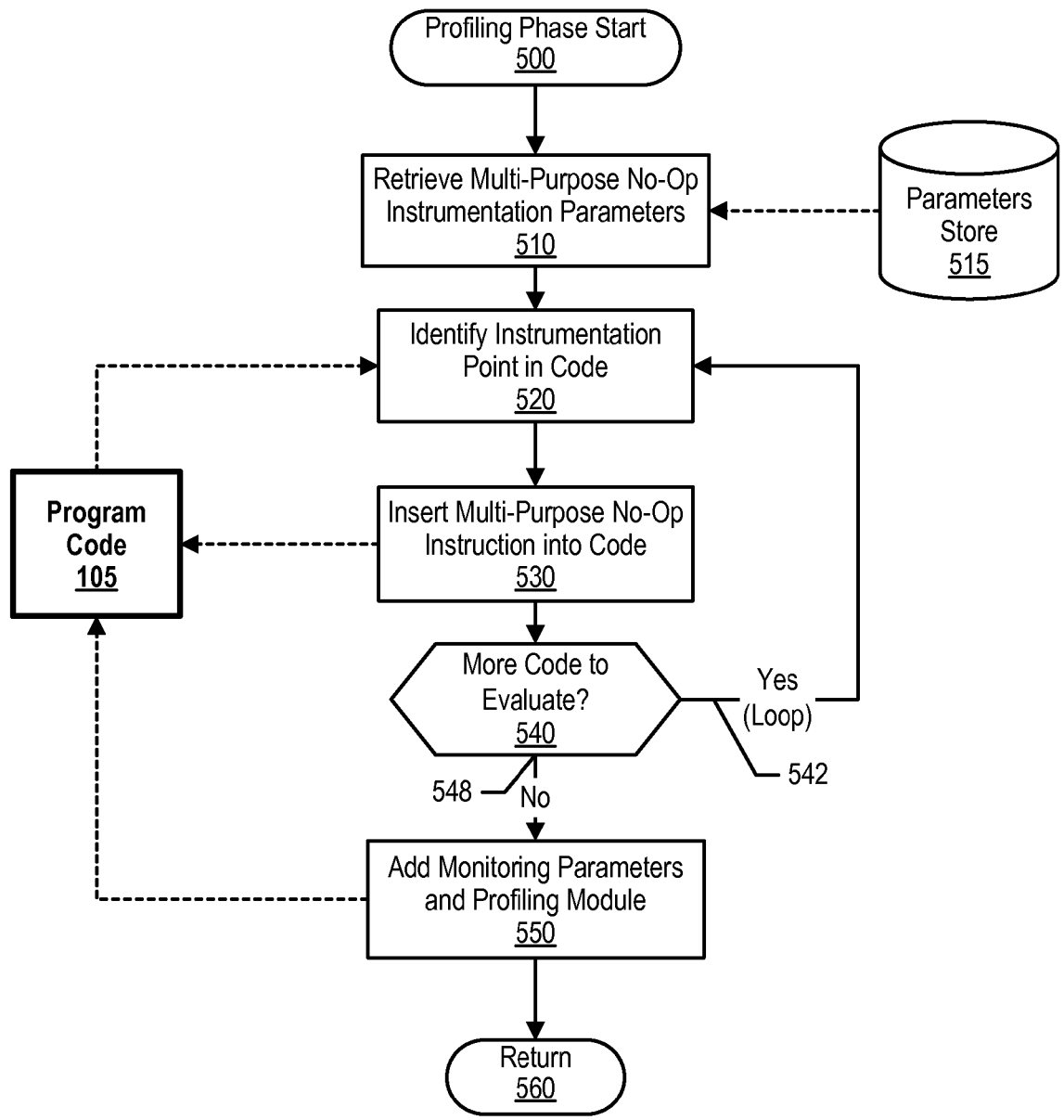
FIG. 5 is a flowchart showing steps taken in a compiler identifying instruction points within program code and inserting multi-purpose no-op instructions at the instruction points.

FIG. 5 is a flowchart showing steps taken in a compiler identifying instruction points within program code and inserting multi-purpose no-op instructions at the instruction points. Processing commences at 500, whereupon processing retrieves multi-purpose no-op instrumentation parameters at step 510 from parameters store 515, such as preferred locations at which to identify an instrumentation point (e.g., within a loop). Parameters store 515 may be stored on a nonvolatile storage area, such as a computer hard drive.

At step 520, the compiler identifies an instrumentation point in program code 105 based upon the multi-purpose no-op instrumentation parameters. Next, the compiler inserts a multi-purpose no-op instruction at the instrumentation point in program code 105 at step 530 (e.g., multi-purpose no-op instruction 200 shown in FIG. 2).

A determination is made as to whether more of program code 105 should be evaluated (decision 540). If program code 105 should be further evaluated, decision 540 branches to "Yes" branch 542, which loops back to identify more instrumentation points and insert multi-purpose no-op instructions into program code 105. This looping continues until the compiler is finished analyzing program code 105, at which point decision 540 branches to "No" branch 548.

At step 550, the compiler adds multi-purpose no-op monitoring parameters and the profiling module to program code 105. The multi-purpose no-op monitoring parameters instruct a no-op instruction tracking unit when to invoke an interrupt (e.g., after detecting 20 multi-purpose no-op instructions) and the profiling module collects particular profiling data when the interrupt is invoked. Processing returns at 560.

Figure 6:
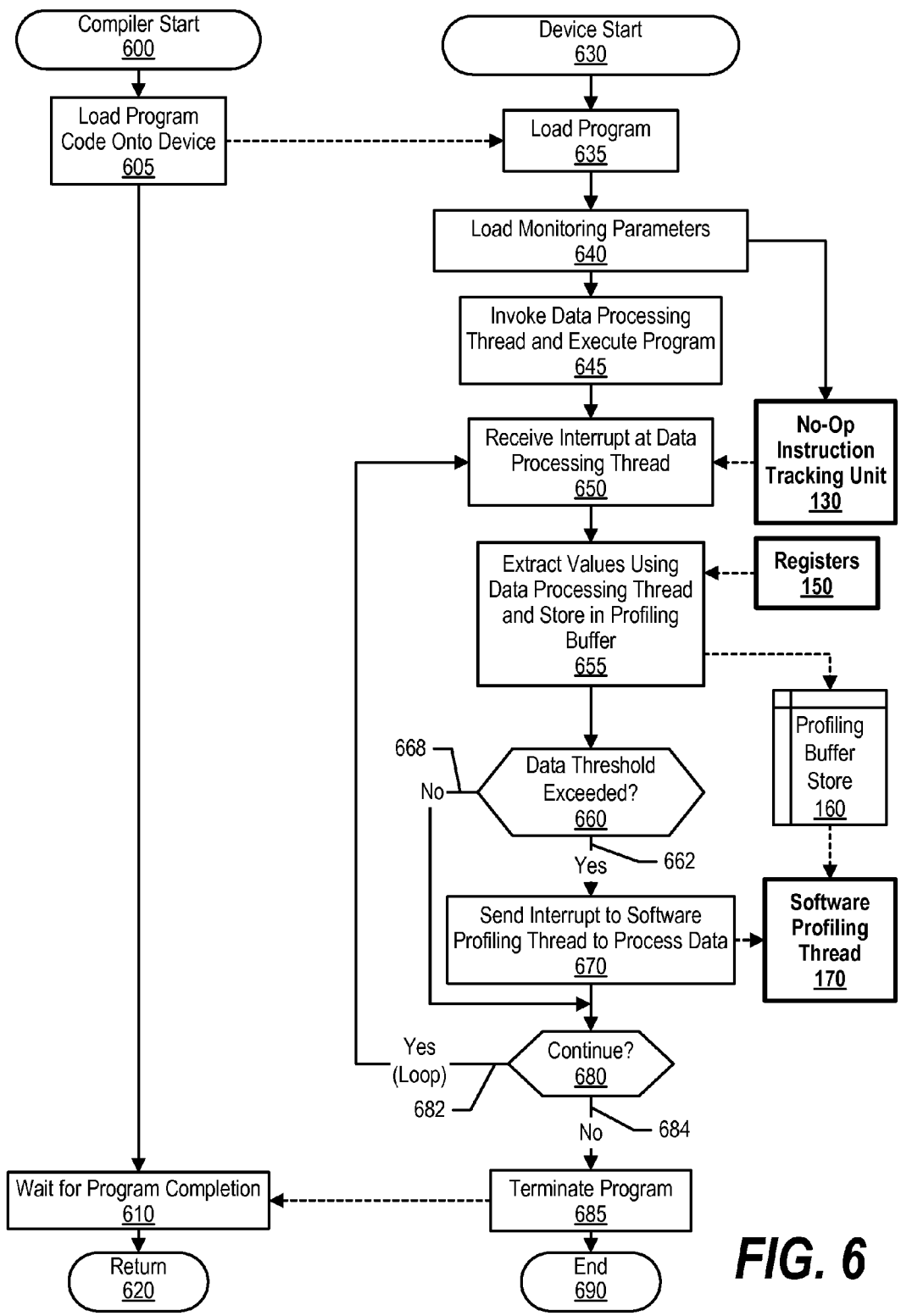
FIG. 6 is a flowchart showing steps in a device collecting profiling data while executing program code.

FIG. 6 is a flowchart showing steps in a device collecting profiling data while executing program code. Compiler processing commences at 600, whereupon the compiler loads program code into the device at step 605. Device processing commences at 630, whereupon the device loads the program code into program memory at step 635. The device also loads multi-purpose no-op monitoring parameters into no-op instruction tracking unit 130 at step 640, which, for example, instructs no-op instruction tracking unit 130 when to invoke a synchronous interrupt.

At step 645, the device invokes a data processing thread to execute the program code. As the data processing thread executes the program code, no-op instruction tracking unit 130 monitors the program code and counts the number of decoded multi-purpose no-op instructions (see FIG. 3 and corresponding text for further details). In time, no-op instruction tracking unit 130 sends a synchronous interrupt to the device's processor, which freezes the data processing thread and instructs the profiling module in the data processing thread to execute. In turn, the profiling module extracts profiling data from registers 150 and stores the values in profiling buffer store (step 655).

The data processing thread determines whether profiling buffer store 160 is full (decision 660). If profiling buffer store 160 is full, decision 660 branches to "Yes" branch 662 whereupon the data processing thread sends an interrupt to software profiling thread 170 to retrieve and process the data stored in profiling buffer store 160 (step 670). On the other hand, if profiling buffer store 160 is not full, decision 660 branches to "No" branch 668, bypassing interrupt invoking steps.

A determination is made as to whether the data processing thread should continue to execute the program code and collect profiling data (decision 680). If the data processing thread should continue, decision 680 branches to "Yes" branch 682, which loops back to wait for synchronous interrupts and collect more profiling data. This looping continues until the data processing thread should stop, at which point decision 680 branches to "No" branch 684 whereupon the program terminates at step 685. The compiler, at step 610, is notified of the program termination, and returns at 620.

FIG. 7 is a flowchart showing steps in a compiler using collected profiling data to optimize program code. Compiler processing commences at 700, whereupon the compiler retrieves profiling data from device 110 at step 710. In one embodiment, a software profiling thread provides the profiling data while program code 105 executes on device 110.

Next, at step 720, the compiler analyzes the profiling data to identify locations within program code 105 for which to optimize (see FIG. 2 and corresponding text for further details). Once identified, the compiler optimizes program code 105 at step 730, and loads the optimized program code 105 into device 110 for further testing at step 740. Processing returns at 750.

Figure 8:
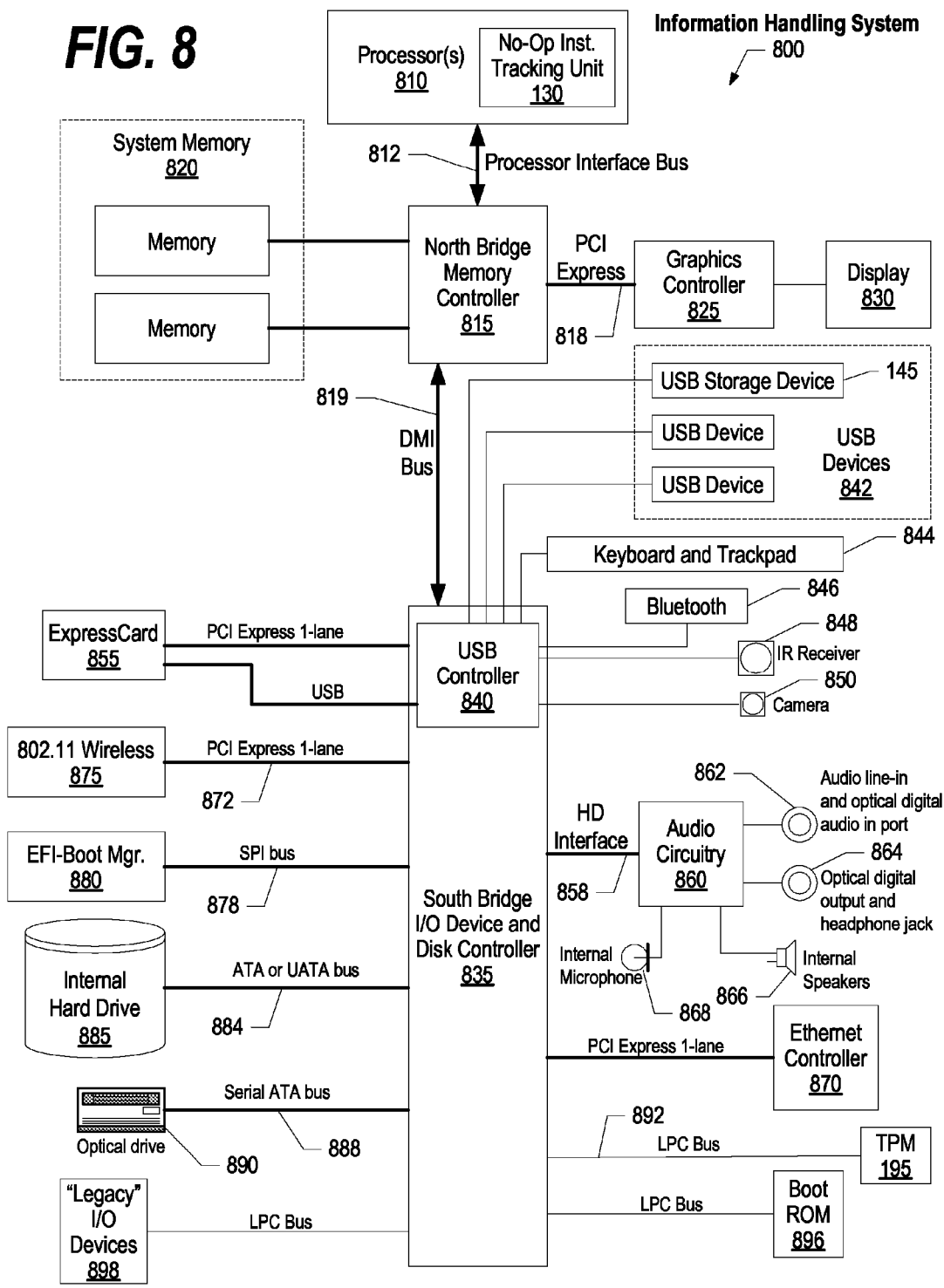
FIG. 8 is a block diagram example of a data processing system in which the methods described herein can be implemented.

FIG. 8 illustrates information handling system 800, which is a simplified example of a computer system capable of performing the computing operations described herein. Information handling system 800 includes one or more processors 810 coupled to processor interface bus 812. One or more processors 810 may include no-op instruction tracking unit 130. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wirelessly communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 895) shown in FIG. 8 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 9.

FIG. 9 provides an extension example of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 945 can be shared among two or more information handling systems using various techniques, such as connecting the removable nonvolatile storage device 945 to a USB port or other connector of the information handling systems.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   a memory to store program code;
   a processor that executes the program code on a first processing thread;
   an instruction tracking unit that decodes a multi-purpose no-op instruction included in the program code and sends an interrupt to the processor in response to decoding the multi-purpose no-op instruction;
   in response to receiving the interrupt, invoking by the processor a profiling module to collect profiling data and store the profiling data in a profiling buffer; and
   in response to detecting that the profiling buffer is full, sending by the first processing thread a subsequent interrupt to a second processing thread that invokes the second processing thread to retrieve the profiling data from the profiling buffer.

2. The information handling system of claim 1 wherein the multi-purpose no-op instruction is devoid from processing by an execution unit.

3. The information handling system of claim 1 wherein a compiler utilizes the profiling data to optimize the program code.

4. The information handling system of claim 1 wherein the instruction tracking unit further comprises:
   a completion table;
   an instruction decode unit for decoding an instruction group, the instruction group including the multi-purpose no-op instruction and a plurality of executable instructions; and
   an instruction sequencing unit for storing the multi-purpose no-op instruction in the completion table and sending each of the one or more executable instructions to one or more execution units.

5. The information handling system of claim 4 further comprising:
   an interrupt generator that generates the interrupt after detecting that the one or more execution units have completed all of the one or more executable instructions.

6. The information handling system of claim 1 wherein the interrupt is a synchronous interrupt.

7. The information handling system of claim 1 further comprising:
   a multi-purpose no-op instruction counter for tracking a number of multi-purpose no-op instructions, wherein the instruction tracking unit sends the interrupt in response to the number of multi-purpose no-op instructions exceeding a threshold.

8. The information handling system of claim 1 wherein:
   a compiler identifies an instrumentation point in the program code and inserts the multi-purpose no-op instruction into the program code at the instrumentation point; and
   the compiler includes the profiling module in the program code.

9. A machine-implemented method comprising:
   executing, by a processor, program code on a first processing thread;
   receiving a multi-purpose no-op instruction included in the program code, wherein the multi-purpose no-op instruction is devoid from execution by an execution unit;
   adjusting a no-op instruction counter value in response to receiving the multi-purpose no-op instruction;
   invoking an interrupt based upon the adjusted no-op instruction counter value;
   collecting profiling data and storing the profiling data in a profiling buffer in response to the invoked interrupt;
   detecting, by the first processing thread, that the profiling buffer is full; and
   sending, in response the detecting, a subsequent interrupt from the first processing thread to a second processing thread that invokes the second processing thread to retrieve the profiling data from the profiling buffer.

10. The method of claim 9 wherein a compiler identifies an instrumentation point in the program code and inserts the multi-purpose no-op instruction into the program code at the instrumentation point.

11. The method of claim 10 wherein the compiler utilizes the profiling data to optimize the program code.

12. The method of claim 10 wherein the compiler includes a profiling module in the program code to perform the collection of the profiling data.

13. The method of claim 9 further comprising:
   decoding an instruction group, the instruction group including the multi-purpose no-op instruction and a plurality of executable instructions;
   storing the multi-purpose no-op instruction directly to a completion table; and
   sending each of the one or more executable instructions to one or more execution units.

14. The method of claim 13 wherein the interrupt is generated after detecting that the one or more execution units have completed each of the one or more executable instructions.

15. The method of claim 9 wherein the interrupt is a synchronous interrupt.

16. A machine-implemented method comprising:
   identifying an instrumentation point within a program code;
   including a multi-purpose no-op instruction in the program code at the identified instrumentation point, wherein the multi-purpose no-op instruction is adapted to invoke one of a plurality of events based upon a number of times that that the multi-purpose no-op instruction is decoded;
   storing the program code with the included multi-purpose no-op instruction;
   including a profiling module in the program code that, in response to one of the plurality of events being an interrupt, collects profiling data from one or more registers and stores the profiling data in a profiling buffer;
   executing, by a processor, the program code on a first processing thread;
   detecting, by the first processing thread, that the profiling buffer is full; and
   sending, in response the detecting, a subsequent interrupt from the first processing thread to a second processing thread that invokes the second processing thread to retrieve the profiling data from the profiling buffer.

17. The method of claim 16 further comprising:
   retrieving the profiling data from the device;
   analyzing the profiling data; and
   optimizing the stored program code based upon the analysis of the profiling data.

* * * * *